Dec. 13, 1960 J. R. A. BEALE 2,964,430
METHOD OF MAKING SEMICONDUCTOR DEVICE
Filed May 20, 1958

INVENTOR
J.R.A. BEALE

BY Frank R. Jifari
AGENT

United States Patent Office 2,964,430

Patented Dec. 13, 1960

2,964,430

METHOD OF MAKING SEMICONDUCTOR DEVICE

Julian Robert Anthony Beale, Wraysbury, near Staines, England, assignor to North American Philips Company, Inc., New York, N.Y.

Filed May 20, 1958, Ser. No. 736,549

Claims priority, application Great Britain May 21, 1957

10 Claims. (Cl. 148—1.5)

The invention relates to a method of producing a semi-conductive device comprising a semi-conductive body, which contains a zone diffused into the surface, this zone having a given conductivity type and a comparatively thick portion which is related to a comparatively thin portion.

A known technique for the manufacture of semi-conductive devices consists in the so-called diffusion technique, in which into a semi-conductive body a suitable impurity is diffused via the surface thereof, so that in the body a superficially diffused layer of a conductivity type determined by the impurity is formed. On this diffused layer are then provided one or more contacts, it being then required in many cases that below one of these contacts the layer should be extremely thin and it should be quite reproduceable with respect to thickness and further properties, for example the variation of the impurity concentration therein, whilst it is furthermore desirable that this thin layer should be related to a thicker, diffused layer, on which, for example, a contact can be arranged, which establishes a possibly low-ohmic connection with the diffused layer below the electrode.

It has been suggested to arrange, in a semi-conductive body, by diffusion, a layer of a given conductivity type in the aforesaid manner, to etch a cavity down to a given depth in the diffused layer and to provide an alloy electrode on the diffused layer by arranging contact material on the bottom of the etched cavity, the assembly being subsequently heated to a temperature which is sufficiently high to perform the desired process of alloying, but which is too low to give rise to an appreciable diffusion. The thickness of the diffused layer below the alloy electrode varies, with this method, with the initial depth of the diffused layer in the body, with the depth of the etched cavity and with the depth of the alloy electrode in the diffused layer. These three factors also affect the magnitude of the resistivity, at the area of the solidification surface during the alloying operation, immediately before the recrystallisation of the electrode takes place, and thus determine the magnitude of the resistivity immediately below the alloy electrode in the diffused layer, since the resistivity in a layer diffused into the surface varies greatly with the position; it is lowest directly below and in the surface and from there it increases strongly towards the interior of the semi-conductive body.

The invention has for its object inter alia to provide a method which exhibits the aforesaid disadvantages to a considerably smaller extent. The invention purports furthermore to provide a method of manufacturing a semi-conductive device, in which the particular possibilities provided by the diffusion technique, for example the reproduceability obtainable and the position-dependence of the resistivity in the diffused layer, are utilized as far as possible for the semi-conductive device to be manufactured, so that this device is capable of fulfilling to a much higher extent than hitherto the aforesaid requirements and demands.

In the manufacture of a semi-conductive device comprising a semi-conductive body which comprises a zone of given conductivity type diffused into the surface, this zone having a comparatively thick portion which is related to at least one comparatively thin portion, a comparatively thick zone of the said conductivity-type is formed, in accordance with the invention, in the semi-conductive body by diffusion through the surface thereof. A portion of the body is then removed locally down to a depth in the body which is greater than or at least nearly as great as the depth of the said, comparatively thick diffused zone, after which, by diffusion through the surface formed by the removal of material, a comparatively thin zone of the said conductivity-type is provided below the new surface, which zone is connected with the comparatively thick zone provided previously. The semi-conductive body, from which the process starts, may, for example, be intrinsically semi-conductive or else it may be of the same conductivity type as the zone obtained by diffusion. The invention provides the advantage of the high reproduceability of the thickness of and the advantageous resistivity pattern in the comparatively thin, diffused zone. There is furthermore the advantage of the relatively independent controllability of the diffusion processes for the comparatively thick and the comparatively thin zone. However, the conductivity type of the semi-conductive body is preferably opposite that of the zone to be obtained by diffusion, since in this case, apart from the said advantages, it is, moreover, ensured that, by the second diffusion process, the position of a p-n- or an n-p-transition with respect to the cavity and the electrode to be arranged therein can be determined.

The impurity to be introduced by diffusion may be the same for the two processes. The removal of a portion of the body is preferably carried out by etching. A cavity may be provided in the semi-conductive body or the etching may be carried out so that the surface of the semi-conductive body exhibits a step. If a circular cavity is provided, the high surface conductivity of the thick diffused layer establishes a low-ohmic, circular, electrical connection with the electrode in the cavity, whilst an electrode, which need not be circular, can be applied to the said surface.

The method according to the invention may be employed for a large range of uses and provides, particularly, a higher reproduceability and a controllability of the depth and the thickness of the comparatively thin, diffused layer below the new surface, since this thickness does no longer depend upon so many factors. Moreover, a low-ohmic layer is thus formed below and in the new surface during the second diffusion process.

The diffusion of the thin layer may take place from a substance applied to the new surface or from the ambient atmosphere. The impurity to be introduced by diffusion during the second process is then provided in the applied substance or is supplied to the cavity from the ambient atmosphere. The diffusion of the comparatively thin layer may, as an alternative, take place from the comparatively thick layers in this case the impurity to be introduced is supplied from the comparatively thick layer already provided. In this respect many variations are possible. It should be noted that, in the latter case, the duration of the heating process and/or the temperature will differ from those of the alloying process as referred to above; they must be such that an appreciable diffusion takes place from the new surface. It should be noted in this respect that with most impurities and semi-conductors the diffusion along the crystal surface is performed considerably more rapidly than the diffusion into the interior of the crystal.

After the thin zone has been formed below the new surface by diffusion, a point contact may, for example, be applied thereto. However, after the diffusion, the new surface is preferably provided with an alloy electrode. In accordance with a further aspect of the invention it is particularly advantageous to apply an alloy electrode to the new surface and to perform the alloying of this electrode and the diffusion of the comparatively thin layer during one and the same heating process. This may be done in a manner also suggested, in which during the alloying process via the solid-liquid interface the suitable impurity is diffused into the body, whilst on the thus formed, diffused layer, during the cooling, recrystallizes a layer, of which the conductivity type and the conductivity are determined by the segregation constants of the impurities in the melt. If an ohmic electrode is applied to the new surface, the contact material to be alloyed contains the impurity to be introduced by diffusion and other impurities, if any, of the same kind. The contact material to be alloyed may also contain an impurity which has a high segregation constant and a low diffusion velocity, this impurity determining the conductivity type and the conductivity of the alloy electrode, and an impurity which has a low segregation constant and a high diffusion velocity, which impurity determines the conductivity type and the conductivity of the diffused zone to be provided below the alloy electrode. In this case it is possible to make different the conductivity type and the conductivity of the alloy electrode and the diffused layer in one heating process. The impurity to be introduced by diffusion may, for example, be supplied to the melt during the alloying process from the atmosphere, combinations of the two methods are also possible. The contact material to be alloyed may contain further components which affect advantageously the process, for example a third impurity, such as lead, which has a poor solubility in the semi-conductor and which is substantially neutral with respect to doping, so that it is possible to obtain a small depth of the melt at a comparatively high temperature, which is advantageous to the diffusion. It will be obvious that this process permits of using many modifications. The great advantage of this method according to the invention resides, inter alia, in the fact that the diffusion of the thin zone takes place via the boundary surface between the melt and the semi-conductive body, so that the thickness of the thin diffused layer and the distribution of the impurity concentrations therein are dependent upon fewer factors and are determined only by the second diffusion process.

The methods according to the invention may be used for the manufacture of many kinds of semi-conductive devices. It is advantageous, in particular, to use the possibility of establishing an ohmic connection with the comparatively thin zone by providing an ohmic electrode on the surrounding, comparatively thick zone. The method may, for example, be used for the manufacture of field-effect transistors, in which case an electrode is applied to the new surface establishing an ohmic contact with the diffused zone. The invention is also suitable for the manufacture of a p-n-p- or n-p-n-transistor structure; in this case the new surface is provided with an electrode establishing a rectifying connection with the diffused zone. In both cases the conductivity type of the body, used as the starting material, is preferably opposite that of the impurity to be introduced by diffusion.

Since the frequency range of a semi-conductive device depends, inter alia, upon the size of the surface of the junction between the diffused zone and the initial body, this surface is preferably confined, after the diffusion processes, by removing part of the body, for example, by etching. To this end a portion of the body may be removed near the spot where already a portion has been removed during the diffusion processes, the portion being removed to a depth which is greater than or at least almost as great as the local depth of the diffused zone. However, to this end a portion of the semi-conductive body is preferably removed from a section of the body which lies opposite the spot where, after the first diffusion process, a portion has been removed.

By way of example, a few aspects of the invention will now be described more fully with reference to the drawing, in which.

Figure 1:
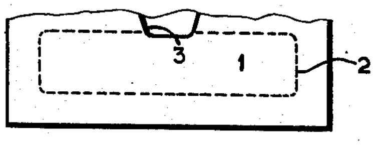
Figs. 1 to 4 show, in a sectional view, the successive stages of a transistor manufacturing method according to the invention.

Fig. 1 is a sectional view of an initially rectangular p-type semi-conductive plate 1, for example, of germanium. The plate had a thickness of about 125$\mu$ and had, initially, a resistivity of about 1 ohm-cm. This plate was introduced into a tubular furnace, which had a diameter of about 3.8 cms. The furnace contained, furthermore, a supply of antimony trichloride. A hydrogen current was passed through the furnace at a rate of about 140 litres per hour. The semi-conductive plate and the supply of antimony trichloride were heated separately in the furnace, the temperatures being about 830° C. and 50° C. respectively. This thermal treatment lasted for about two hours; during this time antimony diffused from the ambient atmosphere in the furnace into the semi-conductive plate, where it formed a p-n-transition or junction at a certain distance below the surface, as indicated in Fig. 1 by the broken line 2.

Figure 2:
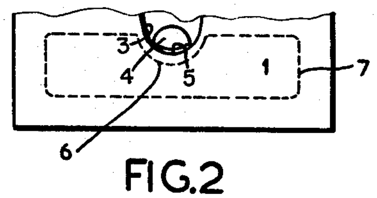

Then part of the body was locally removed by etching a cavity 3 in the body, the depth of this cavity being greater than the depth of the p-n-transition 2. To this end the body was first provided with a mask of polystyrene dissolved in a methyl-ethylketone, leaving a circular aperture; then for about 20 minutes the surface was etched in a solution of 1 part by volume of 40% HF, 1 part by volume of 20% hydrogen peroxide and 4 parts by volume of water. Instead of this method, other methods of etching material locally away may be employed. The cavity 3 is substantially circular. Then a pellet of 98% by weight of lead, 1% by weight of gallium and 1% by weight of antimony, with a diameter of about 125$\mu$ was arranged on the bottom of the cavity. The assembly was then heated at 750° C. for about 10 minutes in a hydrogen atmosphere; after this process the body shown in Fig. 2 was obtained. The antimony diffuses much more rapidly into germanium than the gallium, so that below the cavity a thin diffused zone connected and integral with the first, comparatively thick diffused zone of the same conductivity type was obtained, this thin zone penetrating into the body locally to a greater depth, as well as the p-n-transition 6 determined thereby. On this diffused n-type zone recrystallizes a p-type layer 5, since the segregation constant of gallium exceeds that of antimony, on this recrystallized layer 5 solidifies the metal portion 4 of the electrode, which consists mainly of lead. Since the melting of the pellet and dissolving of the gallium and antimony in the melt are performed rapidly, the diffusion of the antimony takes place substantially from the maximum depth of the solid-liquid interface. The lead serves as a supporting material and is insignificant as an impurity. During the last combined diffusion-alloying process the p-n-junction indicated in Fig. 1 by the broken line 2, penetrates slightly further into the body and can occupy a deeper position, as is indicated, by way of example, in Fig. 2 by 7. Since the diffusion is performed very rapidly along the surface, a surface of high conductivity will be formed from the initially diffused layer and from the melt in the walls of the cavity by diffusion, this surface permitting of establishing a low-ohmic connection between the diffused layer below the p-type domain 5 and the initial body surface.

Figure 3:
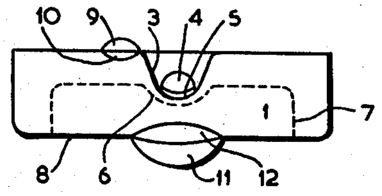

Fig. 3 shows a further stage of the manufacture, in which the portion 8 of the body opposite the provided cavity is etched away. An ohmic electrode (9, 10) is applied to the diffused n-type zone by alloying at 650° C., a pellet of 99% by weight of lead and 1% by weight of arsenic, an n-type recrystallized layer 10 and a lead contact 9, solidified thereon, being thus formed. On the bottom side of the body is provided an alloy electrode (11, 12), which constitutes with the p-type layer an ohmic connection by alloying a pellet of indium at 450° C. In both cases the alloying process took place in a hydrogen atmosphere for about 6 minutes.

Figure 4:
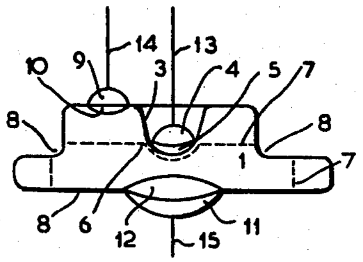

Fig. 4 shows a further stage of the manufacture, in which the surface of the p-n-junction, indicated by the broken line 7, is restricted by etching. The portions removed to this end are indicated in this figure also by the reference numeral 8. The nickel supply wires 14, 13 and 15 are connected to the electrodes 9, 4 and 11 respectively. Finally, the p-n-p-transistor of Fig. 4 is finished in known manner and surrounded, for example, by a lacquer layer. This transistor, in which 4, 9 and 11 designate respectively the emitter electrode, the base contact and the collector electrode, has the advantageous property that the thickness of the diffused base zone between the broken line 6 and the p-type domain 5 is accurately defined by the second diffusion stage, in which the diffusion takes place practically from the deepest solidification surface below the melt, this surface coinciding substantially with the boundary surface between the p-type domain 5 and the base zone. Owing to the diffusion along the walls of the cavity, a highly doped low-ohmic surface is obtained in the walls of the cavity, this surface establishing a low-ohmic connection between the diffused layer below the p-type domain 5 and the low-ohmic surface ring around the cavity, on which the base contact 9 is provided. The resistivity of the n-type domain below the p-type domain 10 increases from the emitter electrode (4, 5) towards the collector electrode (12, 11), since the antimony concentration will be at a maximum near the source of antimony. Thus, the base resistance will be low and, at the same time, a drift field is obtained in the base zone, so that the holes injected by the emitter are additionally accelerated towards the collector, which is advantageous with a view to the frequency range of the transistor. Owing to the restriction of the surface of the p-n-junction, by removing portions, the collector capacity is reduced. Both the reduction of the collector capacity and the reduction in base-series-resistance contribute to a further improvement in the frequency range of the transistor.

Figures 5, 6:
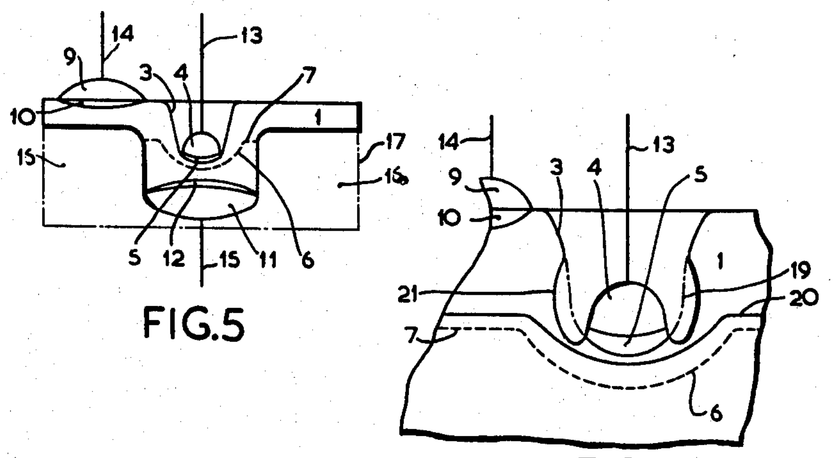
Fig. 5 is a sectional view of a transistor manufactured by carrying out a method according to the invention, which differs slightly from the method described with reference to Figs. 1 to 4.
Fig. 6 is a sectional view of a field-effect transistor manufactured by a method according to the invention.

Fig. 5 shows a further transistor in the same stage of manufacture as in Fig. 4. The manufacture of this transistor is performed in an analogous manner as the transistor described above, the only exception being that, in the last stage of the manufacture, shown in Fig. 5, the surface of the p-n-transition, indicated by the broken line 7, is restricted by removing a portion of the body from the side of the body opposite the cavity 3. The initial body circumference is indicated by the dot-and-dash line 17 and the removed portion is designated by 16. The transistors shown in Figs. 4 and 5 are p-n-p-transistors.

Fig. 6 shows, on an enlarged scale, part of a field-effect transistor of particular type. With this field-effect transistor the current path of the source electrode to the drain electrode lies at the surface of the semi-conductive body. The method of manufacturing is similar to that described with reference to Figs. 1 to 4. In this case, however, the pellet to be alloyed in the cavity consists of 99% by weight of lead and 1% by weight of antimony. During the alloying process the antimony diffuses via the boundary surface between the melt and the semi-conductive body into the body and constitutes in the p-type body again in a similar manner a p-n-junction, which is indicated in Fig. 6 by the broken line (6, 7). Owing to the absence of an acceptor as gallium, the recrystallized layer 5 will be of the n-type, so that the whole semi-conductive domain over the broken line 6, 7 will be of the n-type, whilst only one p-n-transition is formed in the body. A further etching operation is carried out to remove locally, i.e. between the dot-and-dash line 19 and the line 21, the low-ohmic surface from the wall of the cavity. The current path between the two ohmic electrodes (9, 10) and (4, 5), of which electrodes one is the source and the other the drain electrode, thus exhibits a local, annular restriction. The contact provided below the broken line (6, 7) to the p-type domain constitutes, together with this domain, the gate-electrode of the field-effect transistor. If a blocking voltage is applied to the gate-electrode with respect to the other electrodes, a depletion layer is formed, which penetrates into the n-type domain the further, the higher is the blocking voltage. An example of the extension of the depletion layer in the n-type domain is indicated by the line 20, the depletion layer then lying between the broken line 6, 7 and the line 20. By varying the blocking voltage and the corresponding extension of the depletion layer the electrical resistance between the electrodes (9, 10) and (4, 5) may be varied between one state in which the depletion layer has not yet penetrated into the n-type domain and the other extreme state in which the current path is completely blocked, since the depletion layer has extended into the surface 21. The connections 12, 11 and 15 (not shown in Fig. 6) and 9, 10 and 14 may be provided in the same manner as described with reference to Figs. 4 and 5. The semi-conductive device shown in Fig. 6 is very well suited for use as a field-effect transistor. The removal of the annular domain in the wall of the cavity (between the broken line 19 and the line 20) prevents that the depletion layer should not be able to block completely the current path, since a depletion layer can penetrate into a highly doped domain only with difficulty. However, it is advisable to remove the low-ohmic surface only locally. The fact that with this field-effect transistor the highly doped surfaces are immediately adjacent on either side of the slot, these surfaces constituting a low-ohmic contact connected on one side with the electrode (9, 10) and on the other side with the electrode (4, 5), is very conducive to the frequency behaviour and the stability of the field-effect transistor.

Figures 7, 8:
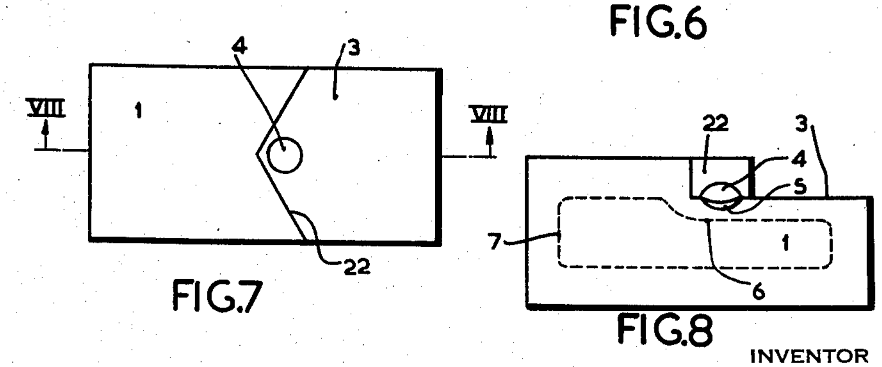
Fig. 7 is a plan view of a further transistor in a stage corresponding to that shown in Fig. 2 of the manufacture according to the invention.
Fig. 8 is a sectional view taken on the line VIII—VIII of Fig. 7.

Figs. 7 and 8 illustrate a further example of use of a method according to the invention, in which part of the body is removed between the two diffusion processes, so that a stepped surface is obtained. The step 22 has the V-like shape shown in a plan view in Fig. 7. The alloy pellet is arranged in the corner of the V-shaped step and the diffusion-alloying process is carried out in the manner described above, so that the diffused zone with the p-n-junction 6, the recrystallized layer 5 and the metal portion 4 are obtained. The further phases of the manufacture are similar to those described above with reference to Figs. 3 and 4 and need not be explained further.

For completeness sake it should be noted that the invention is, of course, not confined to the examples given above. It is neither restricted to the manufacture of the semi-conductive devices described above. Many variants are possible to those skilled in the art. For example, the invention may, of course, be applied to other semi-conductors than those explicitly referred to above, for example, to silicon or semi-conductive compounds.

What is claimed is:

1. A method of manufacturing a semi-conductive body containing a semi-conductive zone of predetermined width, comprising diffusing into a semi-conductive body from a surface thereof a first conductivity-determining impurity to establish within said body a relatively thick first region of one conductivity type separated by a junction from the remainder of said body, thereafter removing a portion only of said first region to expose an interior portion in the near vicinity of the said junction, thereafter diffusing into said exposed portion an impurity of the same conductivity-determining type as said first impurity to extend the said junction further into said body and to form in said body beyond the first region a relatively thin zone of predetermined width of the same one conductivity type and integral with and directly connected to said relatively thick region, and contacting the relatively thick region at its surface.

2. A method as set forth in claim 1 wherein the material-removing step includes an etching treatment.

3. A method as set forth in claim 1 wherein a second impurity-bearing material is fused to an exposed surface of the thin zone.

4. A method as set forth in claim 3 wherein the second impurity in said material is of a conductivity-determining type opposite that of said first impurity, and said fused material establishes a p-n junction with said thin zone.

5. A method of manufacturing a semi-conductive body containing a semi-conductive zone of predetermined width, comprising diffusing into a semi-conductive body from a surface thereof a first conductivity-determining impurity to establish within said body a relatively thick first region of one conductivity type separated by a junction from the remainder of said body, thereafter removing portions of said first region to form a cavity surrounded by the first region and thus expose an interior portion in the near vicinity of the said junction, thereafter diffusing into said exposed portion via the cavity a second impurity of the same conductivity-determining type as said first impurity to extend the said junction further into said body and to form in said body beneath the first region a relatively thin zone of predetermined width of the same one conductivity type and integral with and directly connected to the first region, and contacting the said first region at its surface.

6. A method as set forth in claim 5 wherein the second impurity is added by liquid diffusion from a fused pellet in the cavity.

7. A method as set forth in claim 5 wherein the second impurity is added by gas diffusion from the atmosphere.

8. A method as set forth in claim 5 wherein the second impurity is diffused by solid-state diffusion from the first region.

9. A method as set forth in claim 6, wherein the pellet contains a third impurity of the opposite conductivity-determining type to establish a rectifying connection to the thin zone when solidified.

10. A method of manufacturing a semi-conductive body containing a semi-conductive zone of predetermined width, comprising diffusing into a semi-conductive body from a surface thereof a first conductivity-determining impurity to establish within said body a relatively thick first region of one conductivity type opposite to that of the remainder of said body to establish a p-n junction, thereafter removing from the said surface a portion only of said region and an underlying portion of said body to a depth slightly exceeding that of the junction to expose an interior portion of the body, beyond the said region and junction, thereafter diffusing into said exposed body portion an impurity of the same conductivity-determining-type as said first impurity to extend the junction further inward beyond its original location and to form a relatively thin curved zone of said one type of predetermined width in said body beneath the exposed body portion and integral with the said first region, and contacting the surface of said first region.

References Cited in the file of this patent

UNITED STATES PATENTS

| | | |
|---|---|---|
| 2,725,315 | Fuller | Nov. 29, 1955 |
| 2,742,383 | Barnes et al. | Apr. 17, 1956 |
| 2,821,493 | Carman | Jan. 28, 1958 |
| 2,836,523 | Fuller | May 27, 1958 |
| 2,845,374 | Jones | July 29, 1958 |
| 2,861,229 | Pankove | Nov. 18, 1958 |
| 2,898,247 | Hunter | Aug. 4, 1959 |